US008352625B2

(12) United States Patent
Wang et al.

(10) Patent No.: US 8,352,625 B2
(45) Date of Patent: Jan. 8, 2013

(54) CODED APPLICATION DATA UNIT ORDER RECOVERY IN LAYERED MULTICAST

(75) Inventors: Ye-Kui Wang, Tampere (FI); Miska M. Hannuksela, Ruutana (FI)

(73) Assignee: Nokia Corporation

( * ) Notice: Subject to any disclaimer, the term of this patent is extended or adjusted under 35 U.S.C. 154(b) by 411 days.

(21) Appl. No.: 12/236,413

(22) Filed: Sep. 23, 2008

(65) Prior Publication Data

US 2009/0083434 A1 Mar. 26, 2009

Related U.S. Application Data

(60) Provisional application No. 60/974,777, filed on Sep. 24, 2007.

(51) Int. Cl.
*G06F 15/16* (2006.01)
*H04L 12/28* (2006.01)

(52) U.S. Cl. ......... 709/231; 709/228; 370/351; 370/389

(58) Field of Classification Search ................. 709/228, 709/231; 370/351, 389
See application file for complete search history.

(56) References Cited

U.S. PATENT DOCUMENTS

| | | | | |
|---|---|---|---|---|
| 2002/0184373 A1* | 12/2002 | Maes | ........................... | 709/228 |
| 2003/0002482 A1* | 1/2003 | Kubler et al. | ................ | 370/352 |
| 2005/0265383 A1* | 12/2005 | Melpignano et al. | ......... | 370/465 |
| 2006/0130107 A1* | 6/2006 | Gonder et al. | ................ | 725/110 |
| 2006/0253600 A1* | 11/2006 | Hannuksela | ................... | 709/231 |

FOREIGN PATENT DOCUMENTS

WO    WO-2006/053949    5/2006

OTHER PUBLICATIONS

RFC 3984: RTP Payload Format for H.264 Video, Wenger, et al., Feb. 2005. All pages.*
RFC 3550: RTP: A Transport Protocol for Real-Time Applications, Schulzrinne, et al. Jul. 2003. All pages.*
"Joint Draft 4.0 Multiview Video Coding" Jun. 2007, pp. 1-34.
"RTP Payload Format for SVC Video" Jul. 9, 2007, pp. 1-42.
International Search Report for PCT Application No. PCT/IB2008/053845 mailed Dec. 9, 2009.

* cited by examiner

*Primary Examiner* — Ranodhi Serrao
(74) *Attorney, Agent, or Firm* — Alston & Bird LLP

(57) ABSTRACT

Systems and methods are provided which allow receivers to recover the decoding order of network abstraction layer (NAL) units conveyed in different Real Time Protocol (RTP) sessions. An indication of decoding order for application data units (ADUs) in each packet is included in the packet structure of a PACSI NAL unit, when the PACSI NAL unit is a single-time aggregation packet type A (STAP-A) packet and the PACSI NAL unit is the first NAL unit in an aggregation packet (e.g., when a receiver is subscribed to different RTP session that convey NAL units). If the receiver is subscribed to only a base layer RTP session, the CL-DON indication can be ignored.

19 Claims, 5 Drawing Sheets

```
  0                   1                   2                   3
  0 1 2 3 4 5 6 7 8 9 0 1 2 3 4 5 6 7 8 9 0 1 2 3 4 5 6 7 8 9 0 1
 +-+-+-+-+-+-+-+-+-+-+-+-+-+-+-+-+-+-+-+-+-+-+-+-+-+-+-+-+-+-+-+-+
 |F|NRI|  Type   |R|I|    PRID   |N|  DID  |  QID  |  TID |U|D|O| RR|
 +-+-+-+-+-+-+-+-+-+-+-+-+-+-+-+-+-+-+-+-+-+-+-+-+-+-+-+-+-+-+-+-+
 |X|Y|A|T|P|C|S|E|    TL0PICIDX  |         CL-DON (optional)     |
 +-+-+-+-+-+-+-+-+-+-+-+-+-+-+-+-+-+-+-+-+-+-+-+-+-+-+-+-+-+-+-+-+
 |          NAL unit size 1      |                               |
 +-+-+-+-+-+-+-+-+-+-+-+-+-+-+-+-|        SEI NAL unit 1         |
 |                                                               |
 |                               +-+-+-+-+-+-+-+-+-+-+-+-+-+-+-+-+
 |                               |          NAL unit size 2      |
 +-+-+-+-+-+-+-+-+-+-+-+-+-+-+-+-+-+-+-+-+-+-+-+-+-+-+-+-+-+-+-+-+
 |                                                               |
 |            SEI NAL unit 2                                     |
 |                               +-+-+-+-+-+-+-+-+-+-+-+-+-+-+-+-+
 |                               |
 +-+-+-+-+-+-+-+-+-+-+-+-+-+-+-+-+
```

CODED APPLICATION DATA UNIT ORDER RECOVERY IN LAYERED MULTICAST

CROSS-REFERENCE TO RELATED APPLICATIONS

The present application claims priority to U.S. Provisional Patent Application No. 60/974,777, filed Sep. 24, 2007, which is incorporated herein by reference.

FIELD OF THE INVENTION

The present invention relates generally to the transport of layered media over networks. More particularly, the present invention relates to efficient recovery of decoding order information in layered multicast transport processes.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Multimedia applications include services such as local playback, streaming or on-demand, conversational and broadcast/multicast services. Technologies involved in multimedia applications include, among others, media coding, storage and transmission. Different standards have been specified for different technologies. In video communication systems with fluctuating bandwidth demands, in particular, the use of layered coding is beneficial. For example, this feature may be particularly beneficial in video-enabled mobile phones that can cope with changes in connection speed during the lifetime of a session. Such changes may be necessitated, for example, due to a fallback from Wireless Local Area Network (WLAN) to third generation (3G) networks or from 3G networks to Global System for Mobile communications (GSM) networks. In layered coding, a base layer is selected to be conveyable over even the slowest of links. Increased video quality is made possible by adding additional "enhancement" layers of video, which are conveyed over faster access technologies.

The most recent work related to video standardization is the extension of ITU-T Recommendation H.264 with a layered coding concept. This work is commonly known as "Scalable Video Coding" or SVC. The latest draft of the SVC standard is described in JVT-X201, "Joint Draft 11 of SVC Amendment," 24th JVT Meeting, Geneva, Switzerland, June-July 2007, available from International Telecommunication Union (ITU) webpage and incorporated herein by reference in its entirety.

In layered coding arrangements, one can commonly observe a hierarchy of layers. For a given higher layer, there is typically at least one lower layer upon which that higher layer depends. When data from the lower layer is lost, the data of the higher layer becomes much less meaningful, and completely useless in some circumstances. Therefore, if there is a need to discard layers or packets belonging to certain layers, it makes sense to first discard the higher layers or packets belonging to the higher layers or, at a minimum, to perform such discarding before discarding lower layers or packets belonging to lower layers.

This layered coding concept can also be extended to multiview video coding (MVC), where each view can be considered as a layer, and each view can be represented by multiple scalable layers. In multiview video coding, video sequences output from different cameras, each corresponding to a view, are encoded into one bitstream. After decoding, to display a certain view, the decoded pictures belonging to that view are displayed. The latest draft of MVC is described in JVT-X209, "Joint Draft 4.0 on Multiview Video Coding", Geneva, Switzerland, June-July 2007, available from ITU webpage and incorporated herein by reference in its entirety.

Layered multicast is a transport technique for scalable coded bitstreams, e.g., SVC or MVC bitstreams. A commonly employed technology for the transport of media over Internet Protocol (IP) networks is known as Real-time Transport Protocol (RTP). In layered multicast using RTP, a layer or a subset of the layers of a scalable bitstream is transported in its own RTP session, where each RTP session belongs to a multicast group. Receivers can join or subscribe to desired RTP sessions or multicast groups to receive the bitstream of certain layers. Conventional RTP and layered multicast is described, e.g., in H. Schulzrinne, S. Casner, S., R. Frederick, and V. Jacobson, "RTP: A Transport Protocol for Real-Time Applications", IETF STD 64, RFC 3550, July 2003, available from the Internet Engineering Task Force (IETF) webpage and S. McCanne, V. Jacobson, and M. Vetterli, "Receiver-driven layered multicast" in Proc. of ACM SIGCOMM'96, pp. 117-130, Stanford, Calif., August 1996.

The H.264/AVC RTP payload format is specified in RFC 3984, available from http://www.ietf.org/rfc/rfc3984.txt. RFC 3984 specifies three packetization modes: single network abstraction layer (NAL) unit packetization mode; non-interleaved packetization mode; and interleaved packetization mode. In the interleaved packetization mode, each NAL unit included in a packet is associated with a decoding order number (DON)-related field such that the NAL unit decoding order can be derived. Alternatively, no DON-related fields are available when the single NAL unit packetization mode or the non-interleaved packetization mode is used. A recent draft of the SVC RTP payload format is available from IETF webpage. In this recent draft, a payload content scalability information (PACSI) NAL unit is specified to contain scalability information, among other types of information, for NAL units included in the RTP packet.

In layered multicast, a receiver that subscribes to more than one RTP session recovers the decoding order of the received NAL units from different RTP sessions before passing them to a decoder. However, complications in NAL unit decoding order recovery arise due to session initiation variation between different RTP sessions, the use of the interleaved packetization mode as specified in RFC 3984 within one or more RTP sessions, and the NAL unit decoding order being different from the output or display order.

The recent draft of the SVC RTP payload format attempts to ensure that the DON over the entire SVC bitstream, referred to as cross-layer DON (CL-DON), can be derived for each NAL unit by requiring the use of the interleaved packetization mode for all the RTP sessions. Additionally, the recent draft further requires that the DON-related fields are derived based on CL-DON. However, some currently existing RFC 3984-type receivers do not have the interleaved packetization mode implemented therein. Therefore, these receivers are not able to join a layered multicast and receive service.

SUMMARY OF THE INVENTION

Various embodiments provide for an indication of decoding order for application data units (ADUs) in each packet to be included in the packet structure. For example, a CL-DON field is included in a PACSI NAL unit when the PACSI NAL unit is included in a single-time aggregation packet type A (STAP-A) packet (where the STAP-A packet is specified in the RFC 3984). Use of STAP-A packets indicates that the non-interleaved packetization mode is in use for the specific RTP session. If the receiver is subscribed to only a single RTP session using the non-interleaved packetization mode, the CL-DON indication can be ignored. However, if the receiver has joined multiple RTP sessions including at least one RTP session using the non-interleaved packetization mode, the CL-DON indication for each RTP packet in the RTP sessions using the non-interleaved packetization mode can be utilized together with the DON fields in packets of other RTP sessions (that use the interleaved packetization mode), to determine the decoding order of the NAL units conveyed in all the RTP sessions and reorder the NAL units properly in a decoding order. Therefore, receivers implemented in accordance with the SVC RTP payload format and in accordance with various embodiments are able to recover the decoding order of NAL units conveyed in different RTP sessions even when the base layer RTP session does not use the interleaved packetization mode, while a RFC 3984 receiver subscribing only to a base layer RTP session can ignore the PACSI NAL units.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
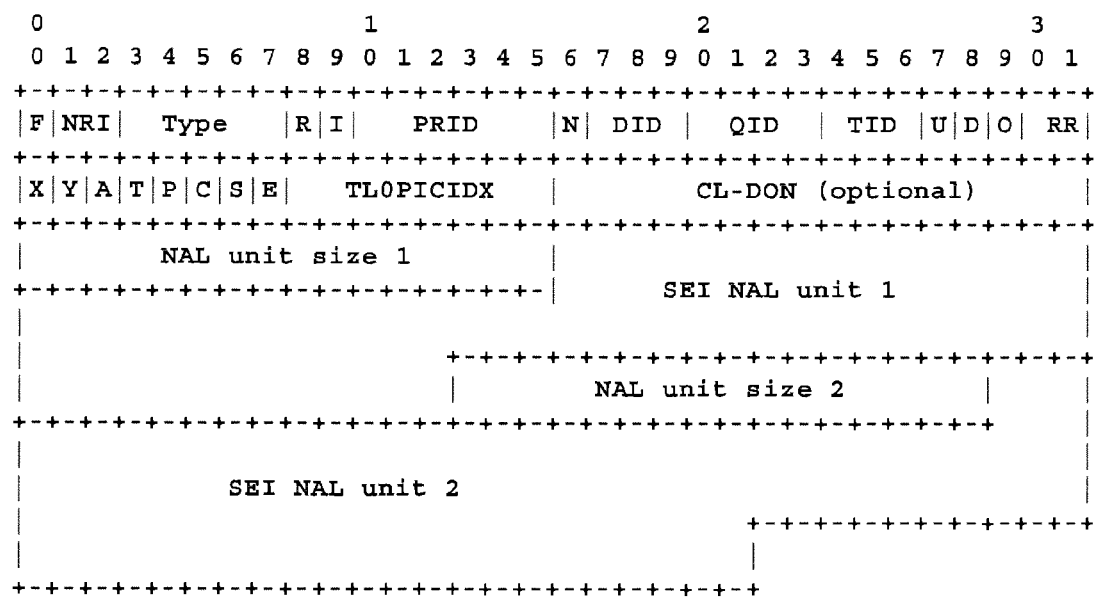
FIG. 1 illustrates a representation of a PCSI NAL unit structure in accordance with various embodiments.

Various embodiments provide systems and methods that enable existing RFC 3984 receivers without interleaved packetization mode implementation to join a layered multicast and receive a service provided by a base layer. More particularly, a CL-DON field can be included in a PACSI NAL unit header. Thus, various embodiments effectuate the presence of CL-DON information for NAL units included in RTP packets, e.g., STAP-A packets, which can be used in the non-interleaved packetization mode, where STAP-As aggregate NAL units with identical NAL unit times. Therefore, receivers implemented in accordance with the SVC RTP payload format and in accordance with various embodiments are able to recover the decoding order of NAL units conveyed in different RTP sessions even when the base layer RTP session does not use the interleaved packetization mode, while the RFC 3984 receiver subscribing only to a base layer RTP session can ignore the PACSI NAL units.

As described above, CL-DON refers to cross-layer decoding order number, which can comprise, e.g., a field in the SVC RTP payload structure, or a derived variable indicating NAL unit decoding order over all the NAL units transported in all the RTP sessions for transporting the SVC bitstream. It should be noted that various embodiments described herein are presented in the context of SVC techniques using RTP. However, the systems and methods of various embodiments can be applied to any layered or scalable codec using any appropriate transport protocol, given that layered multicast is utilized. It should further be noted that, instead of layered multicast, systems and methods of various embodiments can be applied to any transport mechanism where layers of a scalable media bitstream are transmitted through separate logical channels or packet streams.

If it is determined that different layers of a SVC bitstream are transported in more than one RTP session, as in layered multicast, the DON values of all the NAL units in the RTP sessions using the interleaved packetization mode are required to indicate CL-DON values. Additionally, when different layers of a SVC bitstream are transported in more than one RTP session, and at least one STAP-A packet is present in any of the RTP sessions, certain conditions apply.

First, a PACSI NAL unit is present in each STAP-A packet. Furthermore, a CL-DON field is present in the PACSI NAL unit included in each STAP-A packet. Moreover, the DON values for the NAL units in each STAP-A packet indicate CL-DON values and are to be derived as follows. The CL-DON field in the PACSI NAL unit specifies the value of DON for the first NAL unit in the STAP-A in transmission order. For each successive NAL unit in appearance order in the STAP-A, the value of DON is equal to (the value of DON of the previous NAL unit in the STAP-A+1) % 65536, where "%" refers to a modulo operation.

As described above, a NAL unit type referred to as a PACSI NAL unit is effectuated in accordance with various embodiments. The PACSI NAL unit, if present, is the first NAL unit in an aggregation packet, and is not present in other types of packets. The PACSI NAL unit indicates scalability information and other characteristics that are common for all the remaining NAL units in the payload of the aggregation packet. Furthermore, a PACSI NAL unit can include a CL-DON field and contain zero or more supplemental enhancement information (SEI) NAL units. Therefore, the PACSI NAL unit makes it easier for media aware network elements (MANEs) to decide whether to forward/process/discard an aggregation packet containing the PACSI NAL unit. For example, senders can create PACSI NAL units, but receivers can ignore them. Alternatively, the receivers can use the PACSI NAL units as hints to enable efficient aggregation packet processing. It should be noted that the NAL unit type for the PACSI NAL unit can be selected among those values that are unspecified in the SVC standard and RFC 3984.

When the first aggregation unit of an aggregation packet contains a PACSI NAL unit, at least one additional aggregation unit is to be present in the same packet. The RTP header and payload header fields of the aggregation packet are thus set according to the remaining NAL units in the aggregation packet. When a PACSI NAL unit is included in a multi-time aggregation packet (MTAP), the DON for the PACSI NAL unit is set to indicate that the PACSI NAL unit has a DON identical to that of the first NAL unit in decoding order among the remaining NAL units in the aggregation packet.

FIG. 1 illustrates a representation of the structure of a PACSI NAL unit. The first four octets 0, 1, 2, and 3, are the same as the first four octets which comprise a conventional four-byte SVC NAL unit header. They are followed by two always-present octets, two optional octets, and zero or more SEI NAL units, each preceded by a 16-bit unsigned size field (in network byte order) that indicates the size of the following NAL unit in bytes (excluding these two octets, but including the NAL unit type octet of the SEI NAL unit). FIG. 1 illustrates the PACSI NAL unit structure containing, for example, two SEI NAL units.

The CL-DON field is optional and present if the aggregation packet containing the PACSI NAL unit is an STAP-A packet. When present, the CL-DON field is indicative of the CL-DON for the first NAL unit in the STAP-A, in transmission order. It should again be noted that the CL-DON field need not be present when the aggregation packet containing the PACSI NAL unit is not an STAP-A. The values of other fields in the PACSI NAL unit shown in FIG. 1 are set in accordance with the recent SVC RTP payload format draft.

Certain packetization rules in addition to common packetization rules specified in the RFC 3984 for the single NAL unit packetization mode, the non-interleaved packetization mode, and the interleaved packetization mode are complied with in accordance with encoding and/or decoding aspects of various embodiments.

When layers of an SVC bitstream are transported in more than one RTP session, the interleaved packetization mode should be used for all of the RTP sessions. However, if an RTP session does not use the interleaved packetization mode, the non-interleaved packetization mode is used, i.e., STAP-A packets are used, and any other type of packet(s) are not used. Moreover, each STAP-A contains a PACSI NAL unit and the CL-DON field, which is present in the PACSI NAL unit. Therefore, the use of the non-interleaved packetization mode for a session conveying the H.264/AVC compatible (full) base layer can be allowed, such that RFC 3984 receivers without a interleaved packetization mode implemented therein can subscribe to a (full) base layer session.

In another embodiment, the non-interleaved packetization mode is used whenever an RTP session does not use interleaved packetization mode. However, any packet type, i.e., STAP-A, a fragmentation unit type A (FU-A) or a single NAL unit packet, is allowed. As an FU-A or a single NAL unit packet do not contain a CL-DON field, the value of CL-DON for the NAL unit contained in a FU-A or a single NAL unit packet is counted from the CL-DON value derived for the preceding NAL unit in transmission order, e.g. by incrementing the CL-DON value for the preceding NAL unit in transmission order by 1 (in modulo 65536 arithmetic). In another embodiment, a STAP-A is not required to contain the CL-DON field. Instead, the CL-DON value for the first NAL unit following the PACSI NAL unit (if any) in STAP-A is derived as the CL-DON for FU-A or a single NAL unit packet above.

Additionally, non-VCL NAL units can be conveyed in the same session as its associated VCL NAL units. To effectuate this feature, SEI messages that are contained in a scalable nesting SEI message and are applicable to more than one session can be separated and contained in multiple scalable nesting SEI messages. The CL-DON values are thus indicative of values that would result if all of these SEI messages were in separate scalable nesting SEI messages and contained in the beginning of the corresponding access units as conventionally specified in the latest draft SVC standard.

A de-packetization process(es) in addition to common de-packetization rules specified in the RFC 3984 are complied with in accordance with encoding and/or decoding aspects of various embodiments. It should be noted that for a single RTP session, the common de-packetization process(es) (with certain changes) specified in the RFC 3984 are generally applicable. For receiving more than one RTP session conveying a scalable bitstream, an example of a suitable implementation of the de-packetization process(es) is described below, e.g., a de-packetization process(es) for NAL Units conveyed in multiple RTP sessions. As with single RTP session scenarios, de-packetization for multiple RTP sessions results in reordering NAL units from transmission order to the NAL unit decoding order, where "RTP sessions" refer to the RTP sessions for which the NAL units are de-packetized.

A receiver includes a receiver buffer, which is used to compensate for different session initiation times, transmission delay jitter and to reorder NAL units from transmission order to the NAL unit decoding order. It should be noted that the receiver operation is described under an assumption that all of the RTP sessions initiate at the same time and that there is no transmission delay jitter. However, receivers can also accommodate scenarios when both different session initiation times and transmission delay jitter exist. For example, receivers can reserve separate buffers for session initiation variation buffering, transmission delay jitter buffering, and de-session-multiplexing buffering, and/or can use a receiver buffer for all the aforementioned purposes. Moreover, receivers can take session initiation variation and transmission delay jitter into account in the buffering operation; e.g., by additional initial buffering performed before starting decoding and playback.

As described above, when more than one RTP session is used to convey an SVC bitstream, a CL-DON value can be derived for each NAL unit. This enables a NAL unit decoding order recovery process without an individual deinterleaving process for each RTP session, irrespective of whether the RTP session uses the interleaved packetization mode. Excluding the session initiation variation buffer and the transmission delay jitter buffer, the receiver buffer can be referred to as the de-session-multiplexing buffer. The size of the de-session-multiplexing buffer can be set, in terms of number of bytes, to be equal to or greater than the value of the sprop-deint-buf-req media-type parameter of the RTP session (associated with a deinterleaving buffer) conveying the SVC layer for which the decoding requires the presence of the SVC layers conveyed in all of the other RTP sessions. Such an RTP session can be referred to as the highest RTP session. It should be noted that parameters which can provide a receiver with the properties of the stream that will be sent are referred to as "sprop" parameters.

It should be noted that there are two buffering states in the receiver, e.g., "initial buffering" and "buffering-while-playing." Initial buffering can occur when the RTP sessions are initialized. After initial buffering, decoding and playback are started, and the buffering-while-playing mode can be utilized. Regardless of the buffering state, a receiver can store incoming NAL units, in reception order, in the de-session-multiplexing buffer. In other words, NAL units of aggregation packets are stored in the de-session-multiplexing buffer individually, where the value of DON (i.e., CL-DON in this case) is calculated and stored for each NAL unit. It should be noted, however, the CL-DON can be set to have a different value from the DON. For example, if there are three layers, each contains only one NAL unit. In this case then, the CL-DON values for the three NAL units can be $\{0, 1, 2\}$, or $\{3, 10, 18\}, \ldots$, as long as the order is correct, while the gap in between any two NAL units can be flexible.

The receiver operation is also described herein, where initial buffering lasts until at least one of the following conditions is fulfilled: there are N or more VCL NAL units in the de-session-multiplexing buffer, where the constant N refers to the value of the OPTIONAL sprop-interleaving-depth media type parameter of the highest RTP session incremented by 1; if sprop-max-don-diff of the highest RTP session is present, don_diff(m,n) is greater than the value of sprop-max-don-diff of the highest RTP session, in which n corresponds to the NAL unit having the greatest value of AbsDON (defined below) among the received NAL units and m corresponds to the NAL unit having the smallest value of AbsDON among the received NAL unit; and initial buffering has lasted for a duration equal to or greater than the value of the OPTIONAL sprop-init-buf-time media-type parameter of the highest RTP session.

It should be noted that don_diff is a function that is defined as follows:

Let DON(i) be the decoding order number of the NAL unit i.

If DON($m$)=DON($n$), don_diff($m,n$)=0

If (DON($m$)<DON($n$) and DON($n$)−DON($m$)<32768), don_diff($m,n$)=DON($n$)−DON($m$)

If (DON($m$)>DON($n$) and DON($m$)−DON($n$)>= 32768), don_diff($m,n$)=65536−DON($m$)+ DON($n$)

If (DON($m$)<DON($n$) and DON($n$)−DON($m$)>= 32768), don_diff($m,n$)=−(DON($m$)+65536− DON($n$))

If (DON($m$)>DON($n$) and DON($m$)−DON($n$)<32768), don_diff($m,n$)=−(DON($m$)−DON($n$))

Additionally, the NAL units to be removed from the de-session-multiplexing buffer are determined as follows. If the de-session-multiplexing buffer contains at least N VCL NAL units, NAL units are removed from the de-session-multiplexing buffer and passed to the decoder in the order specified below until the buffer contains N−1 VCL NAL units. If sprop-max-don-diff of the highest RTP session is present, all of the NAL units m for which don_diff(m,n) is greater than sprop-max-don-diff of the highest RTP session are removed from the de-session-multiplexing buffer and passed to the decoder in the order specified below. Herein, n corresponds to the NAL unit having the greatest value of AbsDON among the NAL units in the de-session-multiplexing buffer.

The order in which NAL units are passed to the decoder is specified as follows. Letting PDON be a variable that is initialized to 0 at the beginning of the RTP sessions, for each NAL unit associated with a value of DON, a DON distance is calculated. If the value of DON of the NAL unit is larger than the value of PDON, the DON distance is equal to DON−PDON. Otherwise, the DON distance is equal to 65535−PDON+DON+1. NAL units are delivered to the decoder in ascending order of DON distance. If several NAL units share the same value of DON distance, they can be passed to the decoder in any order. When a desired number of NAL units have been passed to the decoder, the value of PDON is set to the value of DON for the last NAL unit passed to the decoder.

Furthermore, payload format parameters can be used to select optional features of the payload format and certain features of the bitstream. These parameters can be specified herein as part of the media-type registration for the SVC codec. A mapping of these parameters into the Session Description Protocol (SDP) standard, specified in RFC4566 is also provided for applications that use SDP. It should be noted, however, that equivalent parameters can be defined for use with control protocols that do not use SDP.

The media type parameters mentioned above or otherwise relevant are defined as follows. The packetization-mode refers to a parameter that signals the properties of an RTP packet stream or the capabilities of a receiver implementation. It should be noted that only a single configuration point can be indicated, and therefore, when capabilities to support more than one packetization-mode are declared, multiple configuration points (RTP payload types) must be used.

When the value of packetization-mode is equal to 0 or packetization-mode is not present, the single NAL mode, as defined in the RFC 3984, MUST be used. It should be noted that this mode is in use in standards using ITU-T Recommendation H.241 [H.241] (as described in the RFC 3984). When the value of packetization-mode is equal to 1, the non-interleaved mode, as defined in the RFC 3984, MUST be used. When the value of packetization-mode is equal to 2, the interleaved mode, as defined in the RFC 3984, MUST be used. It should also be noted that the value of packetization-mode MUST be an integer in the range of 0 to 2, inclusive.

The sprop-interleaving-depth is a parameter that must not be present when the current RTP session does not depend on any other RTP session and packetization-mode is not present. Additionally, the sporp-interleaving-depth parameter must not be present if the value of packetization-mode is equal to 0 or 1. This parameter must be present when the current RTP session depends on any other RTP session or the value of packetization-mode is equal to 2. Furthermore, the sprop-interleaving-depth parameter signals the properties of a NAL unit stream. It specifies the maximum number of VCL NAL units that precede any VCL NAL unit in the NAL unit stream in transmission order and follow the VCL NAL unit in decoding order. Consequently, it is ensured that receivers can reconstruct the NAL unit decoding order when the buffer size for the NAL unit decoding order recovery is at least the value of sprop-interleaving-depth+1 (in terms of VCL NAL units.) Herein, the NAL unit stream refers to the NAL unit stream consisting of all of the NAL units conveyed in the current RTP session and all of the NAL units conveyed in other RTP sessions, if present, that the current RTP session depends on. Additionally, the value of sprop-interleaving-depth must be an integer in the range of 0 to 32767, inclusive.

The sprop-deint-buf-req is a parameter that must not be present when the current RTP session does not depend on any other RTP session, and packetization-mode is not present, or the value of packetization-mode is equal to 0 or 1. This parameter must be present when the current RTP session depends on any other RTP session, or the value of packetization-mode is equal to 2. Additionally, sprop-deint-buf-req signals the required size of the deinterleaving buffer for the NAL unit stream. The value of sprop-deint-buf-req must be greater than or equal to the maximum buffer occupancy (in units of bytes) required in such a deinterleaving buffer (described above). It is ensured that receivers can perform the deinterleaving of interleaved NAL units into the NAL unit decoding order when the deinterleaving buffer size is at least the value of sprop-deint-buf-req in terms of bytes. Herein, the NAL unit stream refers to the NAL unit stream consisting of all of the NAL units conveyed in the current RTP session and all of the NAL units conveyed in other RTP sessions, if present, that the current RTP session depends on. The value of sprop-deint-buf-req must be an integer in the range of 0 to 4294967295, inclusive. It should be noted that the sprop-deint-buf-req parameter indicates the required size of the deinterleaving buffer only. When network jitter can occur, an appropriately sized jitter buffer is provisioned for as well. When a scalable bitstream is conveyed in more than one RTP session, and the sessions initiate at different time, the session initiation variation is also compensated by an appropriately sized buffer.

The sprop-init-buf-time is a parameter that may be used to signal the properties of a NAL unit stream. Herein, the NAL unit stream refers to the NAL unit stream consisting of all of the NAL units conveyed in the current RTP session and all of the NAL units conveyed in other RTP sessions, if present, that the current RTP session depends on. This parameter signals the initial buffering time for a receiver before starting to recover the NAL unit decoding order from the transmission order. The parameter is the maximum value of (transmission time of a NAL unit−decoding time of the NAL unit), assuming reliable and instantaneous transmission, the same timeline for transmission and decoding, and that decoding starts when the first packet arrives. An example of specifying the value of sprop-init-buf-time is as follows.

A NAL unit stream is sent in the following interleaved order, in which the value corresponds to the decoding time and the transmission order is from left to right:

0 2 1 3 5 4 6 8 7 . . .

Assuming a steady transmission rate of NAL units, the transmission times are:

0 1 2 3 4 5 6 7 8 . . .

Subtracting the decoding time from the transmission time column-wise results in the following series:

0 −1 1 0 −1 1 0 −1 1 . . .

Thus, in terms of intervals of NAL unit transmission times, the value of sprop-init-buf-time in this example is 1.

The sprop-init-buf-time parameter is coded as a non-negative base10 integer representation in clock ticks of a 90-kHz clock. If the parameter is not present, no initial buffering time value is defined. Otherwise the value of sprop-init-buf-time must be an integer in the range of 0 to 4294967295, inclusive. In addition to the signaled sprop-init-buf-time, receivers should take into account the transmission delay jitter buffering, including buffering for the delay jitter caused by mixers, translators, gateways, proxies, traffic-shapers, and other network elements. Yet another aspect that the receivers should take into account is the session initiation variation when a scalable bitstream is conveyed in more than one session, including buffering the variation.

The sprop-max-don-diff parameter can be used to signal the properties of a NAL unit stream. However, it is not to be used to signal transmitter or receiver or codec capabilities. The sprop-max-don-diff parameter is an integer in the range of 0 to 32767, inclusive. If sprop-max-don-diff is not present, the value of the parameter is unspecified. Herein again, the NAL unit stream refers to the NAL unit stream consisting of all of the NAL units conveyed in the current RTP session and all of the NAL units conveyed in other RTP sessions, if present, that the current RTP session depends on.

The sprop-max-don-diff parameter is calculated as follows: sprop-max-don-diff=max{AbsDON(i)−AbsDON(j)}, for any i and any j>i. It should be noted that i and j indicate the index of the NAL unit in the transmission order and AbsDON denotes a decoding order number of the NAL unit that does not wrap around to 0 after 65535. In other words, AbsDON is calculated as follows: Let m and n be consecutive NAL units in transmission order. For the very first NAL unit in transmission order (whose index is 0), AbsDON(0)=DON(0). For other NAL units, AbsDON is calculated as follows:

If DON($m$)=DON($n$), AbsDON($n$)=AbsDON($m$)

If (DON($m$)<DON($n$) and DON($n$)−DON($m$)<32768), AbsDON($n$)=AbsDON($m$)+DON($n$)−DON($m$)

If (DON($m$)>DON($n$) and DON($m$)−DON($n$)>= 32768), AbsDON($n$)=AbsDON($m$)+65536− DON($m$)+DON($n$)

If (DON($m$)<DON($n$) and DON($n$)−DON($m$)>= 32768), AbsDON($n$)=AbsDON($m$)−(DON($m$)+ 65536−DON($n$))

If (DON($m$)>DON($n$) and DON($m$)−DON($n$)<32768), AbsDON($n$)=AbsDON($m$)−(DON($m$)−DON($n$)), where DON(i) is the decoding order number of the NAL unit having index i in the transmission order.

It should be noted that receivers may use sprop-max-don-diff to trigger which NAL units in the receiver buffer can be passed to the decoder.

Figure 2:
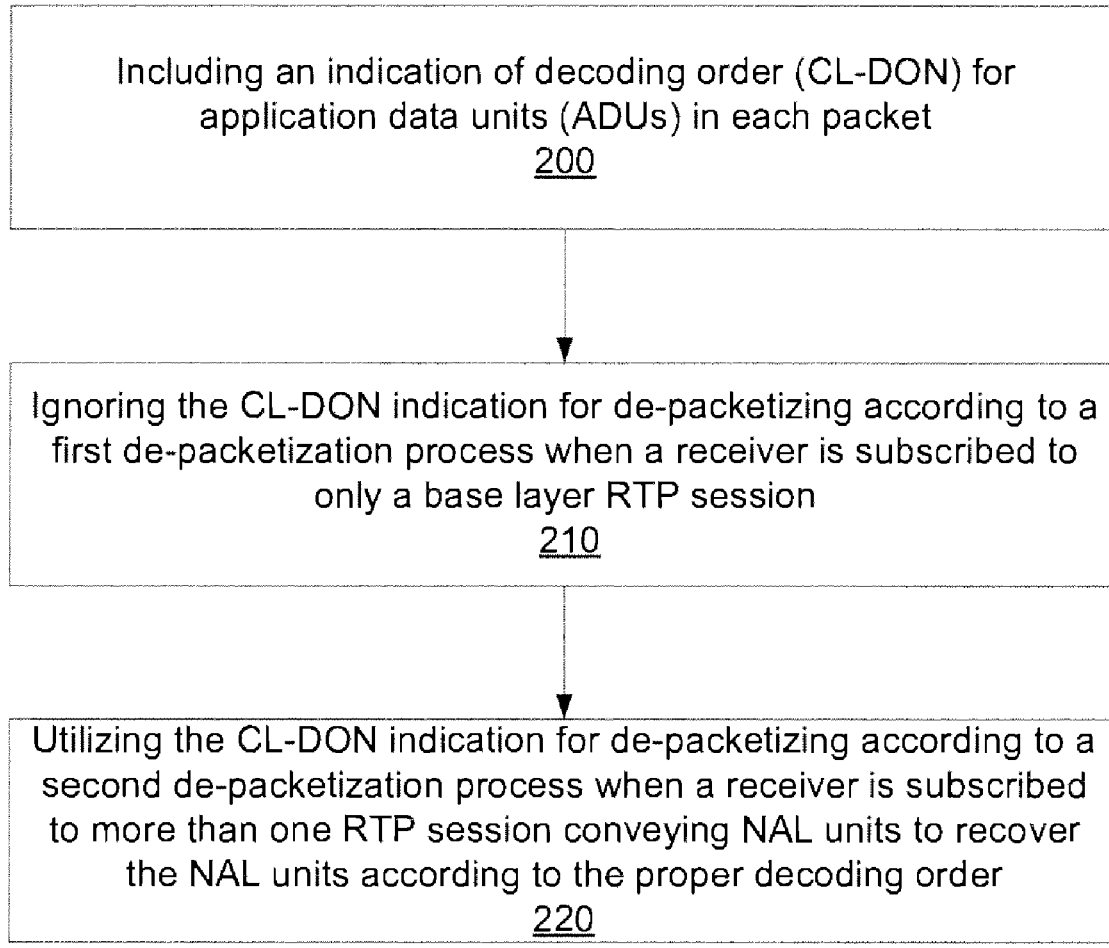
FIG. 2 illustrates a flow chart describing processes executed in accordance with various embodiments.

FIG. 2 is a flow chart illustrating processes performed in accordance with various embodiments to effectuate a method of packetizing and de-packetizing a media stream into transport packets for sending/encoding and receiving/decoding scalable coded bitstreams. At 200, an indication of decoding order for application data units (ADUs) is included in the packet structure in each packet. That is, as described above, the CL-DON field is included in PACSI NAL unit when, for example, the PACSI NAL unit is included in a STAP-A packet. If the receiver is subscribed to only a single RTP session that uses the non-interleaved packetization mode, the CL-DON indication can be ignored at 210 by a first de-packetization process used in conjunction with the non-interleaved packetization mode. The first de-packetization process may, for example, identify each ADU contained in the STAP-A, decapsulate them from the STAP-A, and pass ADUs for decoding in their transmission order. However, if the receiver is subscribed to/has joined multiple RTP sessions, the CL-DON indication for each RTP packet in the RTP sessions using the non-interleaved packetization mode can be utilized together with the DON fields in packets of other RTP sessions (that use the interleaved packetization mode) to determine the decoding order of the NAL units conveyed in all the RTP sessions and reorder the NAL units properly.

Figure 3:
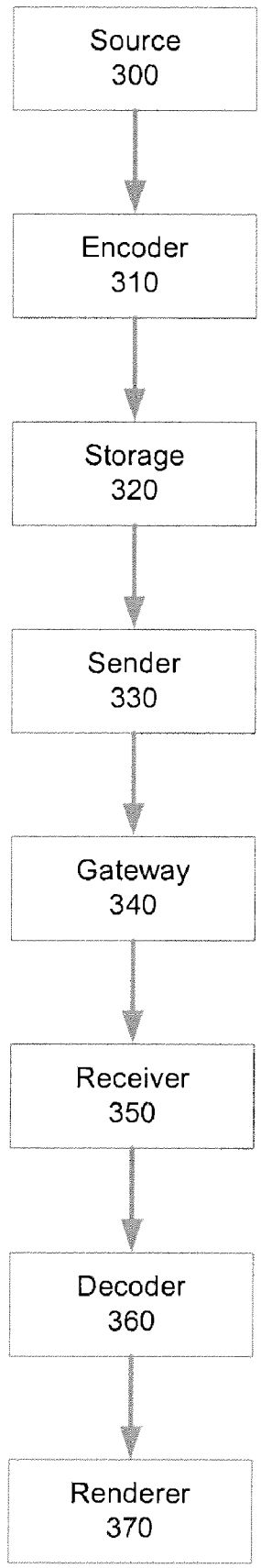
FIG. 3 illustrates a multimedia communications system for use with various embodiments.

FIG. 3 shows a generic multimedia communications system for use with the present invention. As shown in FIG. 3, a data source 300 provides a source signal in an analog, uncompressed digital, or compressed digital format, or any combination of these formats. An encoder 310 encodes the source signal into a coded media bitstream. The encoder 310 may be capable of encoding more than one media type, such as audio and video, or more than one encoder 310 may be required to code different media types of the source signal. The encoder 310 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 310 is considered to simplify the description without a lack of generality.

It should be understood that, although text and examples contained herein may specifically describe an encoding process, one skilled in the art would readily understand that the same concepts and principles also apply to the corresponding decoding process and vice versa.

The coded media bitstream is transferred to a storage 320. The storage 320 may comprise any type of mass memory to store the coded media bitstream. The format of the coded media bitstream in the storage 320 may be an elementary self-contained bitstream format, or one or more coded media bitstreams may be encapsulated into a container file. Some systems operate "live", i.e. omit storage and transfer coded media bitstream from the encoder 310 directly to a sender 330. The coded media bitstream is then transferred to the sender 330, also referred to as the server, on a need basis. The format used in the transmission may be an elementary self-contained bitstream format, a packet stream format, or one or more coded media bitstreams may be encapsulated into a container file. The encoder 310, the storage 320, and the sender 330 may reside in the same physical device or they may be included in separate devices. The encoder 310 and the sender 330 may operate with live real-time content, in which case the coded media bitstream is typically not stored permanently, but rather buffered for small periods of time in the content encoder 310 and/or in the sender 330 to smooth out variations in processing delay, transfer delay, and coded media bitrate.

The sender 330 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 330 encapsulates the coded media bitstream into packets. For example, when RTP is used, the sender 330 encapsulates the coded media bitstream into RTP packets according to an RTP payload format. Typically, each media type has a dedicated RTP payload format. It should be again noted that a system may contain more than one sender 330, but for the sake of simplicity, the following description only considers one sender 130.

The sender 330 may or may not be connected to a gateway 340 through a communication network. The gateway 340 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 340 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 340 is often an RTP mixer and may act as an endpoint of an RTP connection.

The system includes one or more receivers 350, typically capable of receiving, de-modulating, and de-capsulating the transmitted signal into a coded media bitstream. The coded media bitstream is typically processed further by a decoder 360, whose output is one or more uncompressed media streams. Finally, a renderer 370 may reproduce the uncompressed media streams with a loudspeaker or a display, for example. The receiver 350, the decoder 360, and the renderer 370 may reside in the same physical device or they may be included in separate devices.

It should be noted that the bitstream to be decoded can be received from a remote device located within virtually any type of network. Additionally, the bitstream can be received from local hardware or software.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 4:
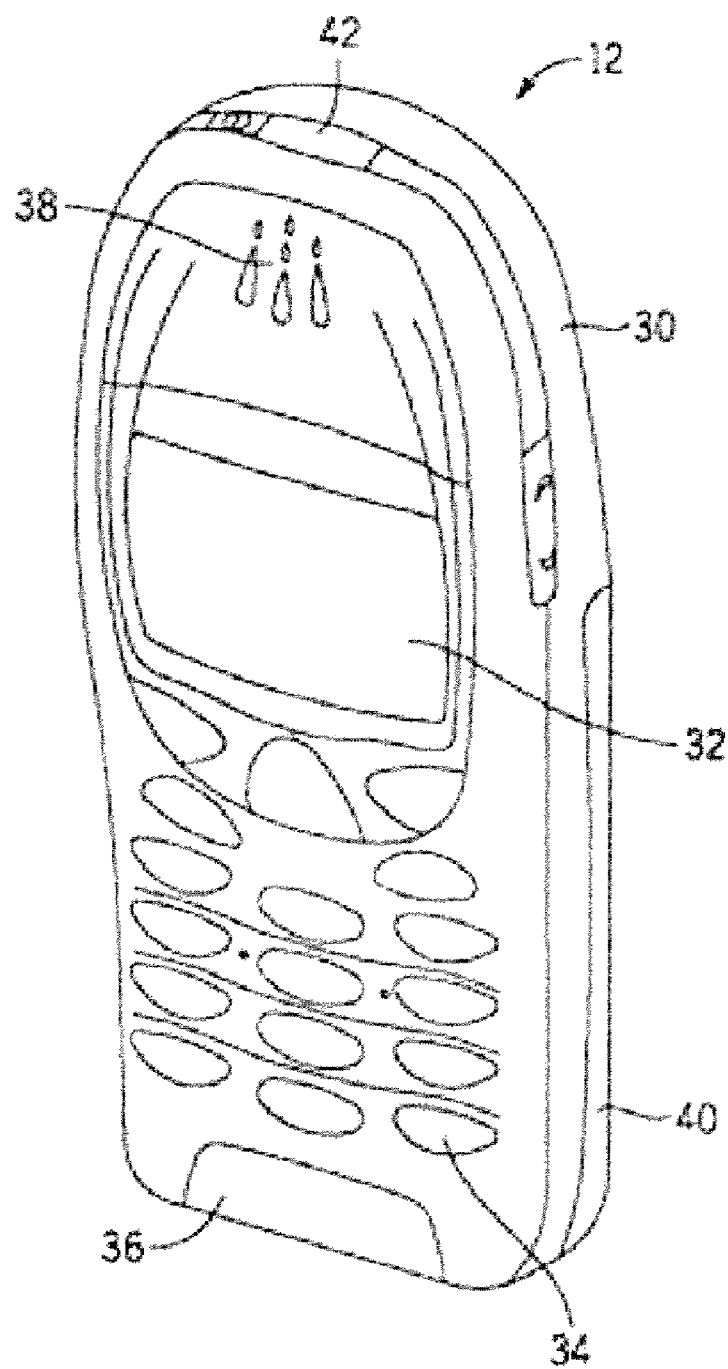
FIG. 4 is a perspective view of a mobile telephone that can be used in the implementation of the present invention.
Figure 5:
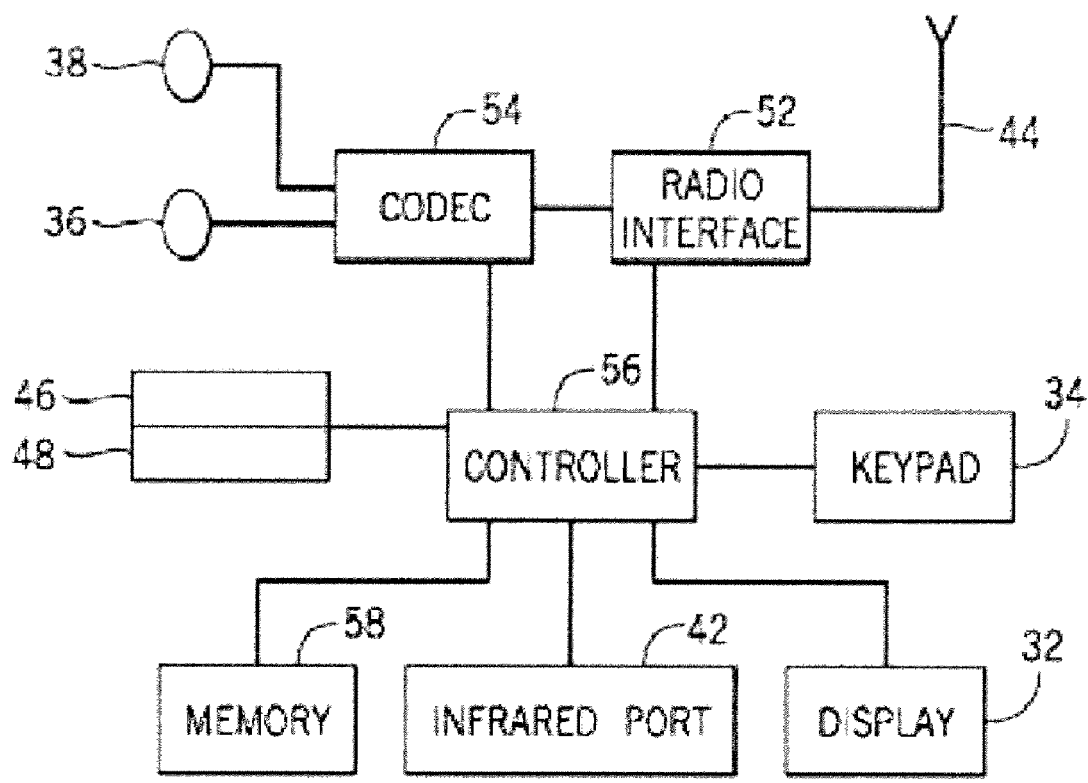
FIG. 5 is a schematic representation of the telephone circuitry of the mobile telephone of FIG. 4.

FIGS. 4 and 5 show one representative mobile device 12 within which the present invention may be implemented. It should be understood, however, that the present invention is not intended to be limited to one particular type of mobile device 12 or other electronic device. Some or all of the features depicted in FIGS. 4 and 5 could be incorporated into any or all of the devices represented in FIG. 1.

The mobile device 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

What is claimed is:

1. A method of packetizing a media stream into transport packets, comprising:
   determining, via a processor, whether application data units are to be conveyed in a plurality of transport sessions to a receiver; and
   upon a determination that the application data units are to be conveyed in the plurality of transport sessions, including a first decoding order indication in a first transport session transport packet, and including a second decoding order indication in a second transport session transport packet, wherein the first decoding order indication and the second decoding order indication comprise at least one value indicative of a decoding order of the application data units in the media stream, and wherein the first decoding order indication is indicated to be unnecessary in the absence of a second transport session containing the second transport session transport packet.

2. The method of claim 1, wherein the media stream is a scalable video bitstream.

3. The method of claim 1, wherein the transport packets are formed according to a real-time transport protocol.

4. The method of claim 1, wherein the decoding order indication is included in a payload content scalability information network abstraction layer unit of the at least one transport packet.

5. The method of claim 4, wherein the payload content scalability information network abstraction layer unit is the first network abstraction layer unit in the at least one transport packet, the at least one transport packet comprising an aggregation packet.

6. The method of claim 1, wherein the application data units are comprised of, at least in part, network abstraction layer units.

7. The method of claim 1, wherein the media stream is received by the receiver, and wherein the receiver subscribes to one of a single transport session of the plurality of transport sessions, and ignores the decoding order indication.

8. The method of claim 1, wherein each of the plurality of transport sessions utilizes one of a non-interleaved packetization mode and an interleaved packetization mode.

9. A computer program product, embodied on a non-transitory computer-readable medium, comprising computer code configured to perform the processes of claim 1.

10. An apparatus, comprising:
a processor; and
a memory unit communicatively connected to the processor and including:
computer code configured to determine whether application data units are to be conveyed in a plurality of transport sessions; and
computer code configured to, upon a determination that the application data units are to be conveyed in the plurality of transport sessions, include a first decoding order indication in a first transport session transport packet, and include a second decoding order indication in a second transport session transport packet for packetizing a media stream, wherein the first decoding order indication and the second decoding order indication comprise at least one value indicative of a decoding order of the application data units transported in the media stream, and wherein the first decoding order indication is indicated to be unnecessary in the absence of a second transport session containing the second transport session transport packet.

11. The apparatus of claim 10, wherein the media stream is a scalable video bitstream.

12. The apparatus of claim 10, wherein the memory unit further comprises computer code configured to form the transport packets according to a real-time transport protocol.

13. The apparatus of claim 10, wherein the memory unit further comprises computer code configured to include the decoding order indication in a payload content scalability information network abstraction layer unit of the at least one transport packet.

14. The apparatus of claim 13, wherein the payload content scalability information network abstraction layer unit is the first network abstraction layer unit in the at least one transport packet, the at least one transport packet comprising an aggregation packet.

15. The apparatus of claim 10, wherein the application data units are comprised of, at least in part, network abstraction layer units.

16. The apparatus of claim 10, wherein the media stream is received by a receiver that subscribes to one of a single transport session of the plurality of transport sessions, and wherein the receiver ignores the decoding order indication.

17. The apparatus of claim 10, wherein each of the plurality of transport sessions utilize one of a non-interleaved packetization mode, and an interleaved packetization mode.

18. An apparatus, comprising:
means for determining whether application data units are to be conveyed in a plurality of transport sessions; and
means for, upon a determination that the application data units are to be conveyed in the plurality of transport sessions, including a first decoding order indication in a first transport session transport packet, and including a second decoding order indication in a second transport session transport packet, for packetizing a media stream, wherein the decoding order indication comprises at least one value indicative of a decoding order of the application data units transported in the media stream, and wherein the first decoding order indication is indicated to be unnecessary in the absence of a second transport session containing the second transport session transport packet.

19. The apparatus of claim 18, wherein the media stream is a scalable video bitstream.

* * * * *